United States Patent
Golden et al.

(10) Patent No.: US 7,674,199 B2
(45) Date of Patent: Mar. 9, 2010

(54) RIGIDIZABLE CHAIN

(75) Inventors: Michael Golden, Newport Beach, CA (US); Joshua Hearn, Lake Forest, CA (US)

(73) Assignee: Meggitt Defense Systems, Inc., Irvine, CA (US)

(*) Notice: Subject to any disclaimer, the term of this patent is extended or adjusted under 35 U.S.C. 154(b) by 902 days.

(21) Appl. No.: 11/166,952

(22) Filed: Jun. 24, 2005

(65) Prior Publication Data

US 2006/0293138 A1 Dec. 28, 2006

(51) Int. Cl.
*F16G 13/02* (2006.01)
*F41A 9/00* (2006.01)

(52) U.S. Cl. .............................. 474/206; 474/155; 89/47

(58) Field of Classification Search ................. 474/140, 474/206, 152, 155, 223, 153, 202; 89/47, 89/45, 146, 151, 154
See application file for complete search history.

(56) References Cited

U.S. PATENT DOCUMENTS

| 889,321 | A | 6/1908 | Meigs et al. |
| 925,819 | A | 6/1909 | Meigs et al. |
| 932,034 | A | 8/1909 | Krone |
| 987,513 | A | 3/1911 | Vogeler |
| 3,727,515 | A | 4/1973 | Nelson et al. |
| 3,742,775 | A | 7/1973 | Hayes et al. |
| 4,658,577 | A * | 4/1987 | Klein .......................... 59/78.1 |
| 4,719,840 | A | 1/1988 | Goodell et al. |
| 5,277,097 | A | 1/1994 | Pehker |
| 5,895,880 | A | 4/1999 | Golden |
| 2004/0185978 | A1* | 9/2004 | Prince ........................ 474/206 |
| 2006/0236852 | A1* | 10/2006 | Joubert ........................... 89/45 |

FOREIGN PATENT DOCUMENTS

| DE | 173815 | 7/1906 |
| GB | 10849 | 0/1912 |

* cited by examiner

*Primary Examiner*—Robert A Siconolfi
*Assistant Examiner*—Thomas W Irvin
(74) *Attorney, Agent, or Firm*—Walter A. Hackler (57) ABSTRACT

Projectile ramming apparatus includes a rammer pawl for engaging the base of a projectile with a rigidizable chain attached to the rammer pawl for providing reciprocating movement thereto. The rigidizable chaining includes a plurality of rows of links having adjacent links pivotally attached to one another. A perimeter of each link enables fixed engagement of adjacent links on each row upon coordinated pivoting of adjacent links in each row and, further, for enabling release of the fixed engagement upon reverse coordinated pivoting of adjacent links. A drive is provided for reciprocally moving the chain and for pivoting adjacent links in order to rigidize the chain as the chain is moved in a forward direction; and unlocking, or unrigidizing, adjacent links as the chain is moved in a reverse direction. The chain is moved at a generally constant velocity enabled by the link perimeter.

3 Claims, 7 Drawing Sheets

RIGIDIZABLE CHAIN

The present invention relates generally to chains, specifically rigidizable chains, suitable for any use but particularly useful for ammunition handling apparatus for loading large ammunition rounds into the breach of a gun.

The loading of ammunition into the breach of a large caliber gun requires the use of a rammer, or rod, for pushing the round through a guideway and into the gun tube. In certain circumstances, for example, when the gun is mounted in a tank or a vehicle, space limitations mandate that a stowable rammer be utilized, since a rigid ramrod in lengths in excess of 6 ft. would be required for loading a projectile into the gun. Significant force is also required since the projectiles may have a weight up to 110 pounds or more, and the projectile must be rammed with significant speed to assure firm seating and proper obturation of the gun tube. Thus, a projectile rammer must have rod-like characteristics in order to ram the weighted projectile into a gun breach.

Heretofore, compact ramming devices included double chain devices which were capable of folding, if necessary, in order to meet envelope requirements surrounding the gun. Unfortunately, this type of mechanism requires storage of separate chains (often referred to as "strong back chain") and the handling of two chains in a manner uniting, or coupling, the chains to provide for a rigidized chain having rod-like characteristics. The storage of two chains and handling thereof consumes valuable space within a vehicle or tank and requires complex and expensive handling mechanisms. Further, strong back chain, when unrigidized, can only be folded in only direction (opposite for the two chains), and thus cannot be compactly stored in a serpentine manner.

A significant advancement in area of compact ramming devices is set forth in U.S. Pat. No. 5,895,880 entitled "Zipper Chain Projectile Rammer" to Golden. This invention provides for a projectile rammer which utilizes a single rammer chain with a simplified and inexpensive handling mechanism utilizing a rigidizable chain. Further, when unrigidized, the chain can be folded in both directions and thus stored in a compact serpentine manner if desired. One drawback to this chain mechanism is the fact that in operation, a large fluctuation in transverse velocity occurs, which results in a jerking movement. The present invention provides for improved rigidizable chain which virtually eliminates transverse velocity variation, as well as transverse acceleration, which produces a significantly smoother chain movement and rammer action.

SUMMARY OF THE INVENTION

The present invention includes a rigidizable chain which in turn includes a plurality of rows of links and means for pivotally attaching two adjacent links of one of the plurality of rows to one link of another of the plurality of rows.

Each of the links are configured with a particular perimeter which provides a means for enabling fixed engagement of adjacent links in each row upon coordinated pivoting of the adjacent links in each row. In addition, this unique perimeter enables release of the fixed engagement between the adjacent links upon reverse coordinated pivoting of the adjacent links in each row.

More particularly, the perimeter of each link includes an extending arm portion and a spaced apart notch means for receiving an extending arm portion of another adjacent link. More specifically, the extending arm portion of each link has a concave contour enabling spaced apart contact with a corresponding notches of an adjacent link. This structure enables traverse of a constant speed rotor with a resulting generally constant transverse chain velocity.

Preferably, in order to simplify and economize manufacture of the chain, the perimeter of each of the links in all of the rows are identical to one another. While the links must be assembled in a specific pattern, as hereinafter discussed, each of the links have the same shape or perimeter.

In addition, identical surface contours on a forward perimeter of each link and on an aft, or back, perimeter of an adjacent link in each row provide a means for transferring compression loading of the chain from one link to an adjacent link.

Still more particularly, the rigidizable chain may include the first, second, and third rows of links and the means for pivotally attaching to adjacent links includes the attachment of two adjacent links of the first row to one link of the second row and one link of the second row to two adjacent links of the third row.

The rigidizable chain hereinabove described also is included in combination to provide for projectile ramming apparatus which generally includes a rammer pawl means for engaging a base of a projectile in combination with the rigidizable chain and drive means for reciprocally moving the chain for pivoting adjacent links in order to rigidize the chain as the chain is moved in a forward direction. The drive means are also operative for pivoting adjacent links to cause unlocking of adjacent links as the chain is moved in a reverse direction.

More particularly, the means for pivotally attaching the links includes pins extending transverse to the links with preferably two spaced apart pins for each link.

In addition, a first of the two spaced apart pins protrudes from the links farther than a second of the two pins on each side of the chain.

In functional operation therewith, the drive means comprises rotor means for engaging the pins in order to move the chain and, further, a housing is provided which includes channel means for engaging the pins and causing coordinated pivoting of the links by moving the first and second pins through different paths as the chain is moved by the rotor means.

In addition, the present invention encompasses a method for rigidizing a rigidizable chain. The chain as hereinabove described includes a plurality of links along with means for pivotally attaching two adjacent links of one of the plurality of rows to one link of another of the plurality of rows. A perimeter of each link provides a means for enabling a fixed engagement of adjacent links in each row by coordinated pivoting of the adjacent links in each row and, in addition, enabling release of the fixed engagement upon reverse coordinated pivoting of the adjacent links in each row.

The method for rigidizing and unrigidizing the subject chain includes the steps of sequentially pivoting one link of one of the rows in one direction about a link in another of the rows and thereafter pivoting a link adjacent to one link in another of the rows in an opposite direction.

BRIEF DESCRIPTION OF THE DRAWINGS

A better understanding of the present invention may be had with the consideration of the following detailed description, taken in conjunction with the accompanying drawings, in which.

DETAILED DESCRIPTION

Figure 1:
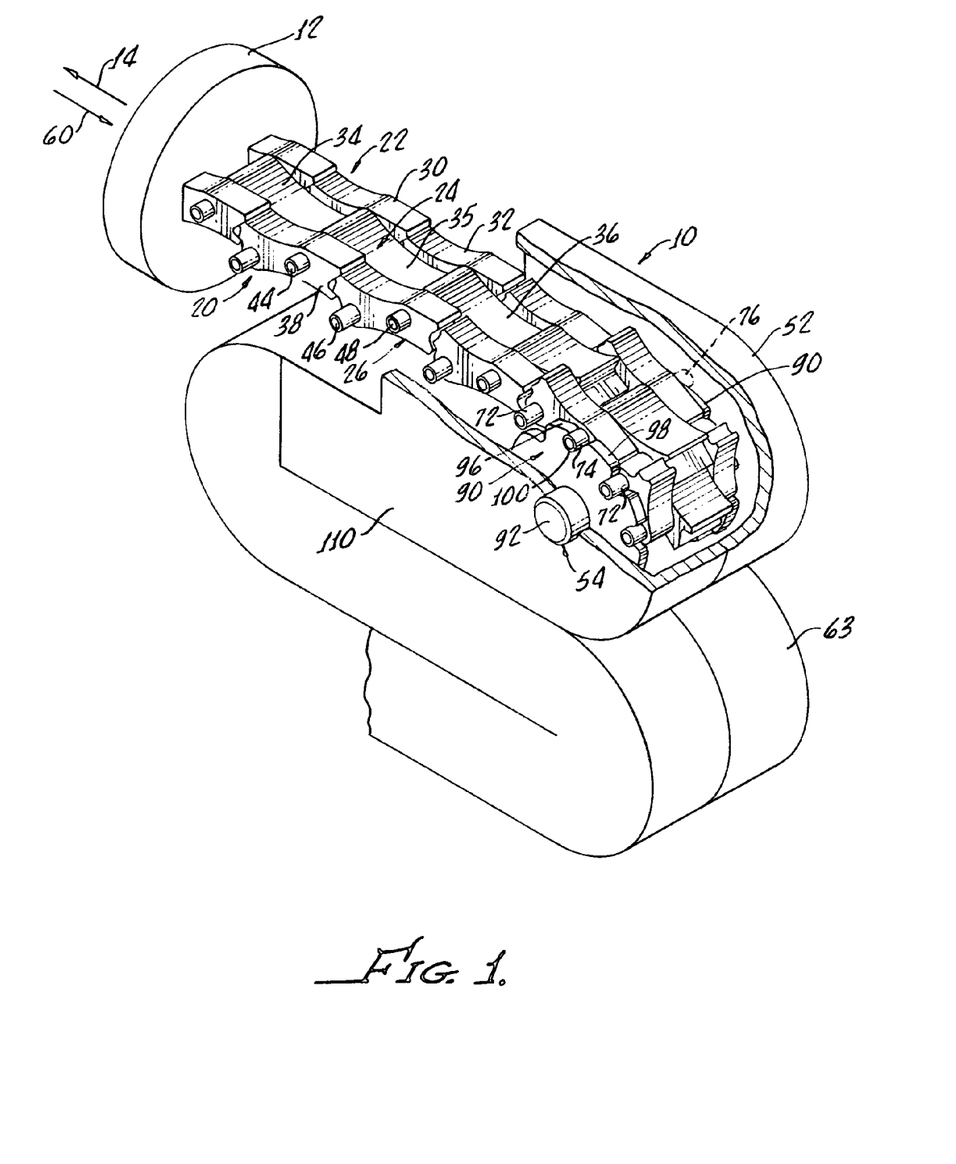
FIG. 1 is a perspective view of a rigidizable chain in accordance with the present invention showing its use in projectile ramming apparatus and generally showing a rammer pawl, the rigidizable chain, drive means for reciprocally moving the chain, and a housing.

FIG. 1 generally shows projectile ramming apparatus 10 generally in accordance with the present invention, which includes a rammer pawl means 12 for engaging a base of a projectile (not shown) in order to drive the projectile in a direction indicated by the arrow 14.

Attached to the pawl is a rigidizable chain 20 which provides a means for providing reciprocating movement to the rammer pawl 12.

More particularly, the rigidizable chain means 20 includes a plurality of rows 22, 24, 26 of links, each including individual adjacent links 30, 32, 34, 35, 36, 38, 40 respectively. As more clearly shown in FIG. 2, pins 44, 45, 46, 48 provide a means for pivotally attaching two adjacent links 38, 40 of a link row 26 to links 34, 35, 36 of a link row 24. Similarly, links 30, 32 are also pivotally connected via the pins 44, 45, 46, 48 to links 34, 35, 36.

The rammer pawl may be attached to the chain 20 by any number of methods. However, if aft space is limited, it is preferably that the aft features of the final link of rows 22 and 26 be incorporated integral to the rammer pawl, 12, itself.

While three rows 22, 24, 26 of links are shown in the Figures, it should be appreciated that a minimum of two rows are required, but any greater number of link rows may be utilized depending upon the physical size of the links and the buckling strength requirements necessary for moving the projectile (not shown) taking into consideration, of course, the space allotment of for the chain 20. If three rows are used, it is desirable that inner row 24 links be twice as thick as outer row 22 and 26 links in order to achieve balanced load capabilities. As a specific example, the ramming approach embodiment 10 may be designed to ram a 110 pound 155 mm howitzer projectile a distance of seven feet with a minimum seating velocity of about twelve feet per second.

The chain 20 is disposed within a housing 52 (FIG. 1) as hereinafter described in greater detail, and drive means 54 is provided for reciprocally moving the chain 20 and for pivoting adjacent links 30, 32, 34, 35, 36, 38, 40 in order to rigidize the chain as the chain 20 is moved in a forward direction indicated by the arrow 14, as also will be hereinafter described in greater detail. In addition, the drive means 54 is operative for pivoting the adjacent links 30, 32, 34, 36, 38, 40 because of unlocking of adjacent links as the chain 20 is moved in a reverse direction, as indicated by the arrow 60, all of this being hereinafter described in greater detail.

The housing 52 may store the chain 20 in a serpentine fashion, as illustrated by a lower magazine 63 in FIG. 1, since the chain 20 when not rigidized is flexible and may be stored in any suitable coiled or curved fashion.

Importantly, a perimeter 58 of each link 30, 32, 34, 35, 36, 38, 40 (FIG. 2) provides a means for enabling fixed engagement of adjacent links 30, 32', 34, 35, 36', 38, 40', respectively in rows 22, 24, 26 upon coordinated pivoting of the adjacent links 30, 32, 34, 35, 36, 38, 40 in each row 22, 24, 26 and for enabling release of the fixed engagement upon reverse coordinated pivoting of the adjacent links in each set. FIG. 1 shows the adjacent links 30, 32 in a locked relationship between the drive means 54 and pawl 12. Importantly, even the leading links of the rigidized chain 20 are completely locked in place, without the need of any additional angular restraint or attachment to the next following link. The chain 20 will not pull straight or unrigidized itself under any combination of tension, compression, vertical, lateral, bending, or torsional loads.

Preferably, the perimeter of all of the links 30, 32, 34, 35, 36, 38, 40 are identical, which greatly simplifies and economizes the cost of manufacture of the chain 20.

For clarity in describing the perimeter 58, only links 30, 32 will be described because of the identical nature of the links 30, 32, 34, 35, 36, 38, 40.

Figure 2:
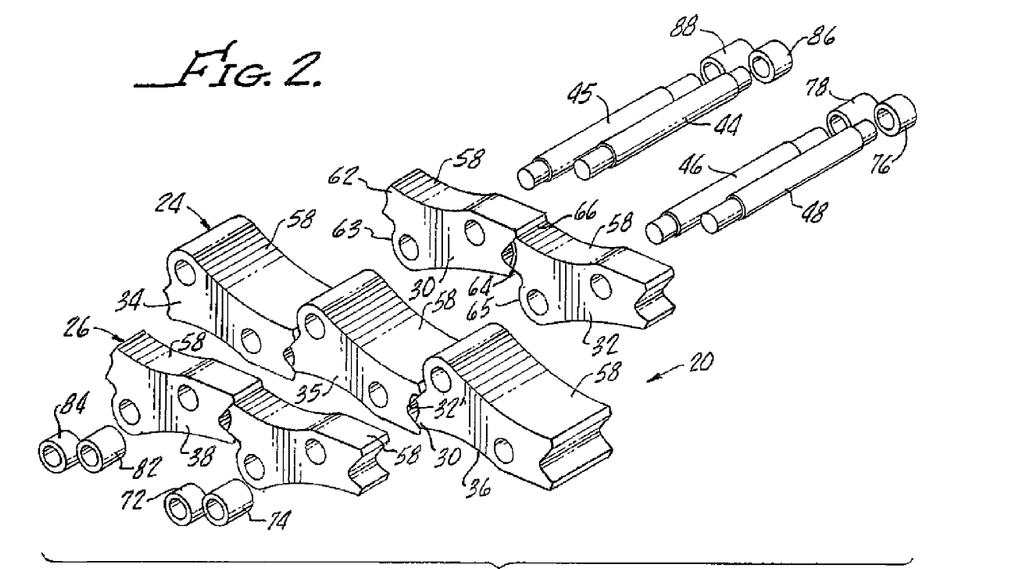
FIG. 2 is an exploded perspective view of the rigidizable chain in accordance with the present invention, the chain links being shown in their rigidized orientation.

As shown in FIG. 2, each link 30 includes an extending arm portion 62 and male radius 63, and a spaced apart notch 64 for receiving the extending arm portion of the adjacent link 32. The extending arm portions 62, 66 have a concave contours 68 to provide a spaced apart contact with the corresponding notch 64 thus creating a gap 70 therebetween, this presents early disengagement upon passing over a ramp 71, see also FIG. 12.

As also shown in FIG. 2, a long pin bushing 72 and a short pin bushing 74 fixed to pins 46, 48, respectively, enable the pin 46 to protrude from the link 40 farther than the pin 48. Similarly, a long bushing 76 fixed to the pin 48 and a short bushing 78 fixed to the pin 46 enables the pin 48 to protrude farther from the link 32 than the pin 46 with the bushing 78. Similar bushings 82, 84, 86, 88 attached to pins 44, 45 will function in a similar manner.

As shown in FIG. 1, the drive means 54 includes a rotor 90 driven by the shaft 92 which includes lobes 96, 98, with recess 100 therebetween for engaging the pin bushings 74, 76 of pin 48 and causing pivoting of the links 30, 32, 34, 35, 36, 38, 40 by moving the pins 46, 48 by way of the bushings 72, 74, through different paths as the chain 20 is moved by the rotors 90.

Figure 3:
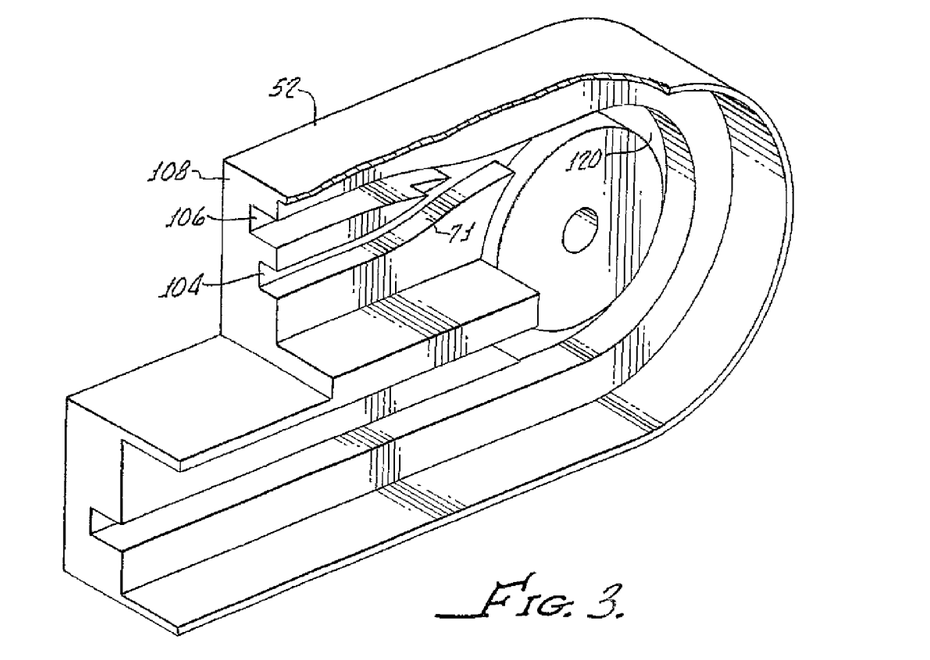
FIG. 3 is a cross sectional perspective view of the housing shown in FIG. 1 showing channels for guiding the pins interconnecting links of the rigidizable chain.

As shown in FIG. 3, this movement is effected by channels 104, 106 formed in the housing wall 108, only one-half of housing 52 being shown in FIG. 3. It should be appreciated that the wall 110 of opposing housing half 52 includes opposing channels, 134, 136, for receiving pin bushings 72, 74, respectively (see FIG. 8).

Figure 4:
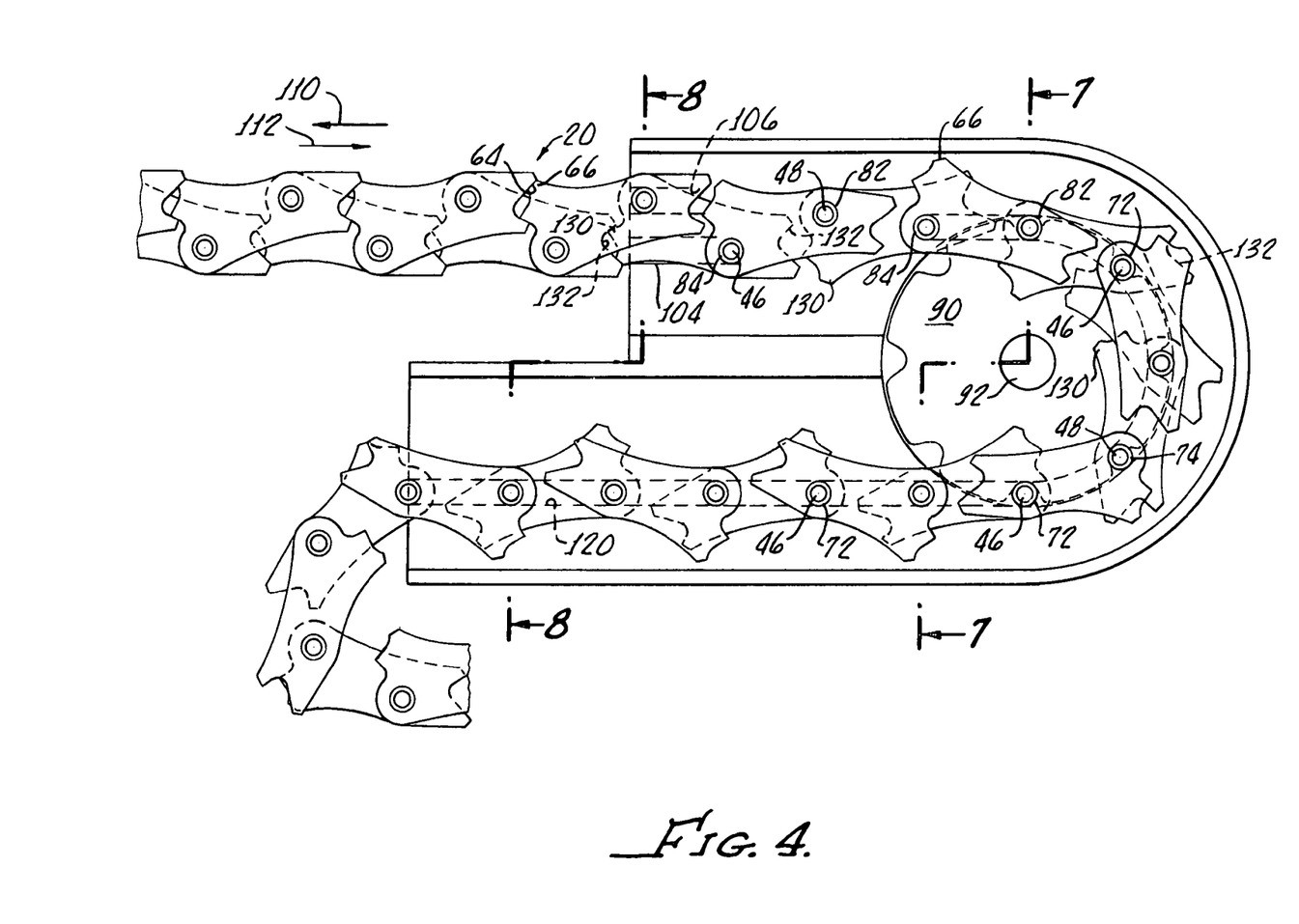
FIG. 4 is a plan view and partial cross section showing movement of the chain about a drive rotor within a housing for causing rigidizing and unrigidizing of the chain with pins attaching links following different grooves in the housing so as to cause exact coordinated pivoting of the chains for enabling fixed engagement of adjacent links in each row of links.

Because the channels 104, 106 have different depths, the longer bushings 76, 86 can only pass through the deeper channel 106. FIG. 4 shows a cross sectional view of the chain 20 passing through the housing 52 and its engagement with the rotors 90 with the chain being rigidized when moved in the direction of the arrow 110 and unrigidized when moved in an opposite direction, as indicated by the arrow 112.

In the present embodiment 10 for a 110 pound 155 mm howitzer the link pitch may be 1 inch and the links 30-40 may be ½" inch thick steel. The links are "rigidized" at plus and minus 30° angles and are driven by an eight-tooth (2.613 inch pitch diameter) sprocket. Both of these selections are a bit arbitrary, the 30° angle being chosen to give adequate separation between channels 104-106 and 134-136; and an eight-tooth sprocket being used as space aft of the projectile is very limited. This same chain 20 can be used with any desired number of sprocket teeth 6 or greater, given appropriate geometry changes to housing 52.

The minimum axial space required aft of the rammer pawl 12 is the sum of:

1) The outside radius of the chain when on the sprocket (about 1.91 inches for a 2.613 pitch, 8 tooth sprocket) plus 2) the length of the channel necessary to full rigidize the chain prior to its exit from the housing (about 5.55 inches for a 1.00 inch pitch chain).

The links 30-40 may be made of any suitable material, even plastic in some cases.

Figure 5:
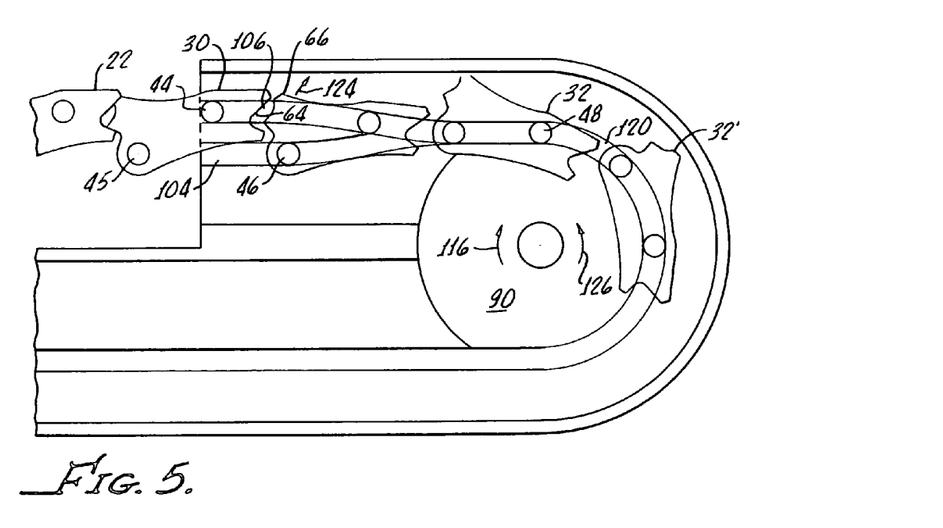
FIG. 5 is a plan diagram view showing coordinated pivoting of an outside link of the rigidizable chain.
Figure 6:
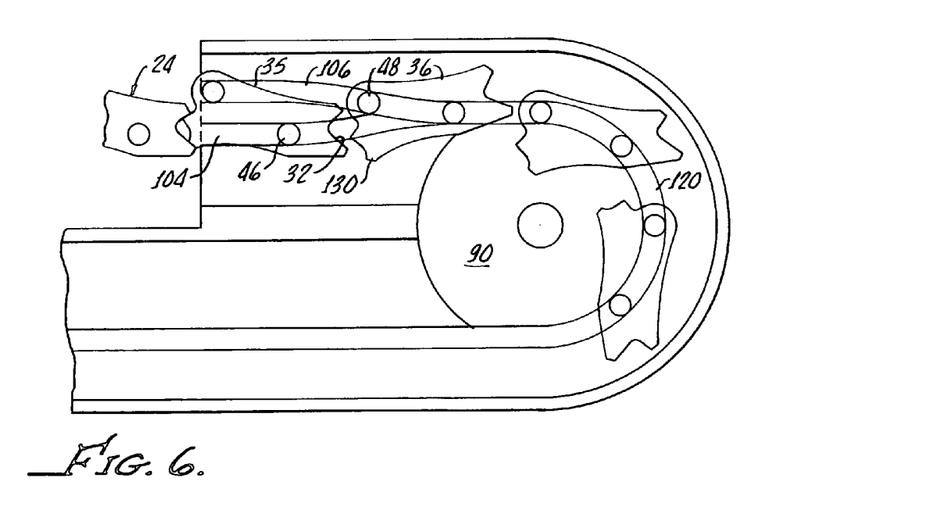
FIG. 6 is a plan diagram view showing coordinated pivoting of an inside link of the rigidizable chain, the chain having progressed one pitch from the orientation shown by FIG. 5.

FIGS. 5 and 6 illustrate the coordinated pivoting of the links 30, 32 in the row 22 and links 35, 36 in the row 24 as they are moved by the rotors 90. Rotation of the rotors 90 in the direction of the arrow 116 causes the pin 46 to move from channels 104 and 134 (see FIG. 8) to a common channel 120, thus causing the arm portion 66 to rotate about pin 46 in the direction of the arrow 124 to cause unlocking from the notch 64 and link 30. Rotation of the rotors 90 in the direction of the arrow 126 causes rigidizing of the link row 22 by movement of the arm portion 66 into the notch 64 as the pin 46 is moved from the common channel into channels 104 and 134 due to the following of the longer bushing 72 into the channel 134.

Further rotation of the link 32 during unrigidizing of the link row 22 by the pin 44 as it moves from the upper channels 106 and 136 into the common channel 120, causes a further rotation of the link 32 as represented by the link 32'.

The coordinated movement of the center link row 24 is shown in FIG. 6 in which movement of the pin 48 from the upper channels 106 and 136 into the common channel 120 causes movement of an arm portion 130 of the link 36 from a notch portion 132 of the link 35 due to the following of longer bushing 76 in channel 106. Continued rotation of the link 36 is provided by movement of the pin 46 from the lower channels 104 and 134 to the common channel 120.

Coordinated movement of the link row 26 is identical to that of the link row 22 shown in FIG. 5. Thus, it should be appreciated that any number of rows of links may be utilized as hereinbefore noted.

It should be noted that the lower magazine 63 may follow any desired serpentine path provided the bend radius is 1 inch or greater (adjacent links will interfere at lesser radii), and common channels 120 continue uninterrupted throughout magazine 63 to preclude the chain from inadvertently "rigidizing" itself.

Figure 7:
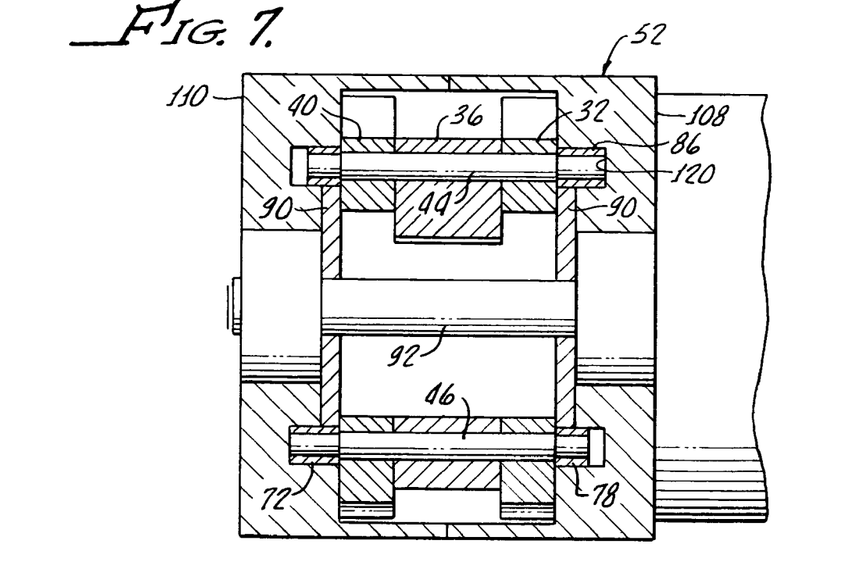
FIG. 7 is a cross sectional view of the housing and chains shown in FIG. 4 taken along the line 7-7.
Figure 8:
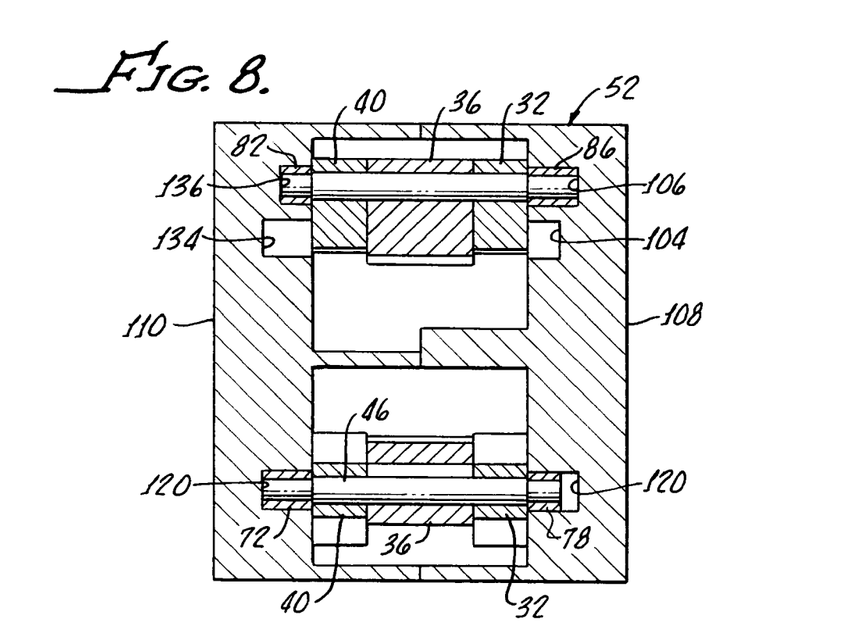
FIG. 8 is a cross sectional view of the housing and chains shown in FIG. 4 taken along the line 8-8.

FIGS. 7 and 8 taken along the lines 7-7 and 8-8 of FIG. 4 are cross sectional views showing the relationship of the links within the housing with coordinated movement controlled by channels 104, 106, 134, 146, and 120 when the links are moved by the pins by the rotor 90.

It should be appreciated that channels 134, 136 in housing wall 110 (see FIG. 8) correspond to channels 104, 106 in housing wall 108; however, channel 134 is a deep channel (as opposed to shallow channel 104) and channel 136 is a shallow channel (as opposed to deep channel 106).

Figure 9:
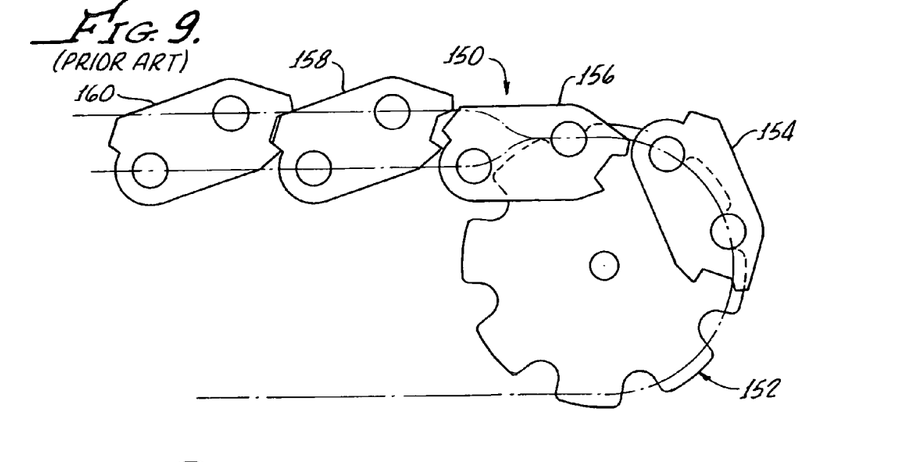
FIG. 9 is a plan view of a prior art rigidizable chain showing movement of the prior art chain about a drive rotor for causing rigidizable and unrigidizing of the chain.

The importance of the concave contour 68 of the extending arm portion 62, 66 is illustrated in FIGS. 9-14. FIG. 9 illustrates a plan view of a prior art rigidizable chain 150 passing over an 8 position drive sprocket rotor 152 showing a relative position of links 154, 156, 158, 160 with coordinated movement controlled by a ramp 162.

Figure 10:
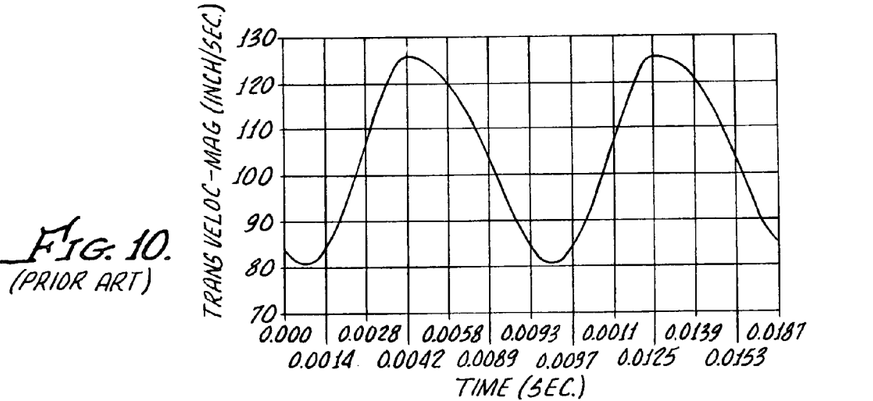
FIG. 10 is a plot of transverse velocity of the prior art chain as a function of time.
Figure 11:
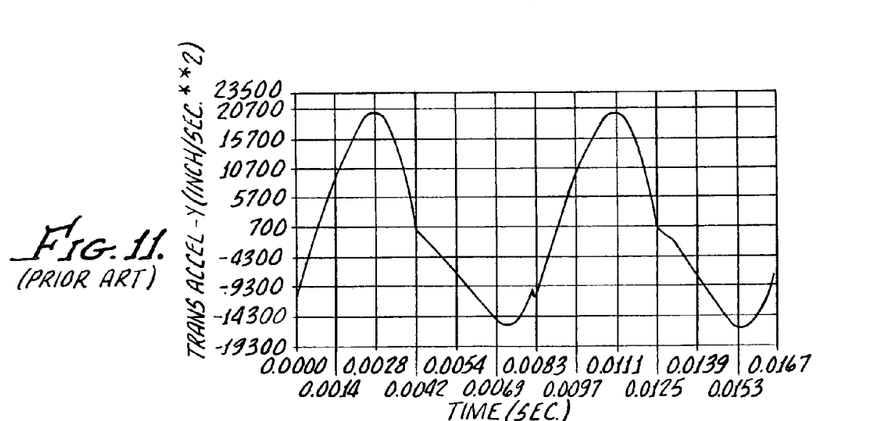
FIG. 11 is a plot of transverse acceleration of the prior art chain as a function of time.

With an average linear velocity of the chain 150 of about 104 inches per second, a translational velocity fluctuation of about 56% occurs, see FIG. 10 along with an acceleration variance between +52 g and −43 g, see FIG. 11.

Figure 12:
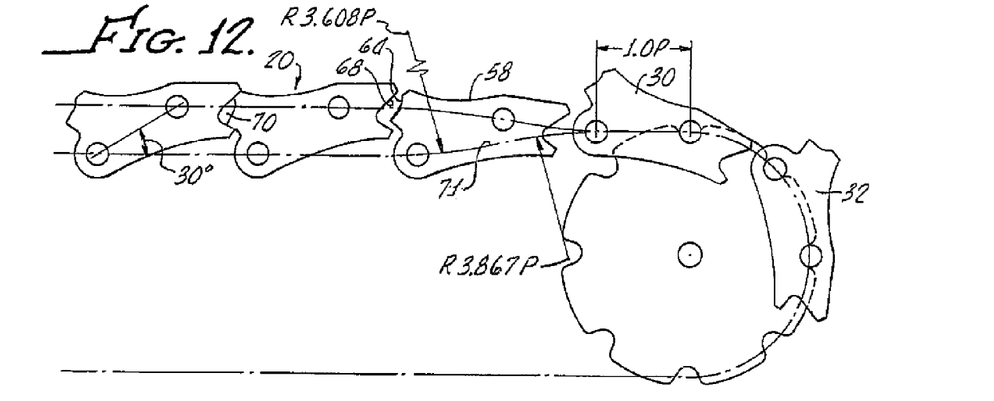
FIG. 12 is a plan view of a rigidizable chain in accordance with the present invention for comparison to the prior art chain shown in FIG. 9.
Figure 13:
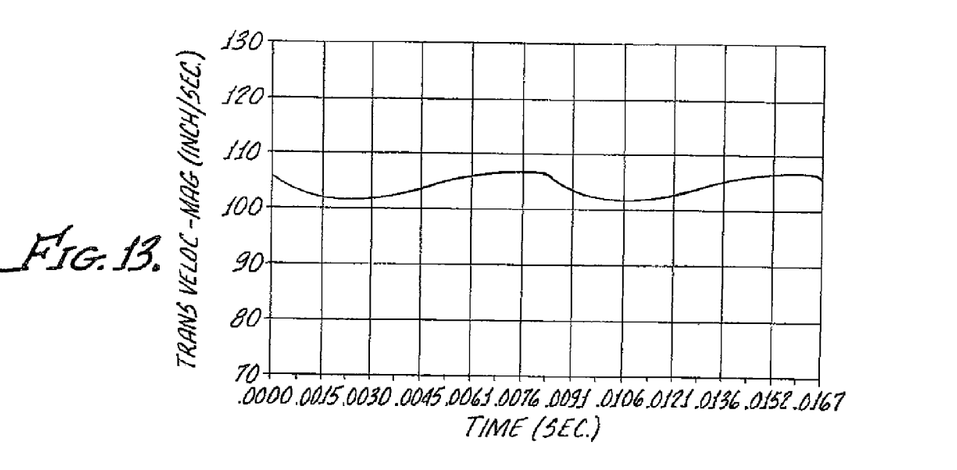
FIG. 13 is a plot of transverse velocity of the chain shown in FIG. 12 illustrating a generally constant velocity over time.
Figure 14:
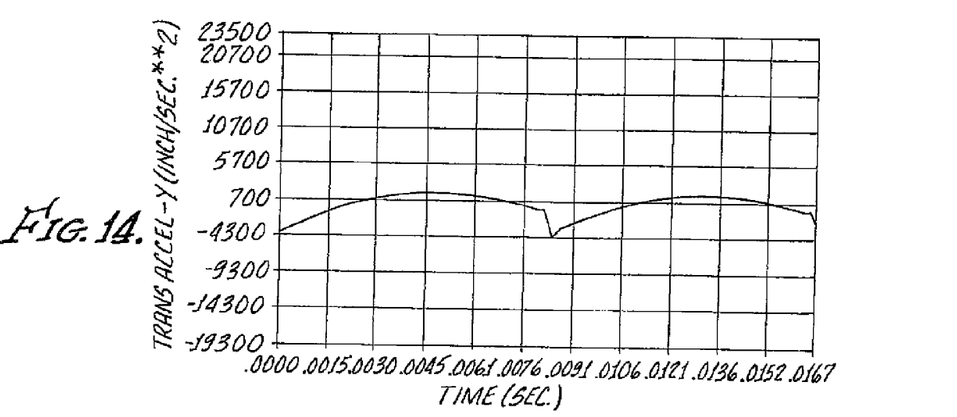
FIG. 14 is a plot of transverse accelerating of the chain shown in FIG. 12 illustrating a generally zero acceleration over time.

This is to be contrasted with the performance of the chain 20 in accordance with the present invention as illustrated for comparison purposes in FIG. 12. Again, based on an average linear velocity of about 104 inches per second. The average velocity fluctuation is less than about 5%, see FIG. 13 as a function of time while the acceleration variation is between +4 g and −12 g see FIG. 14. This unexpected performance improvement is effected through the use of the perimeter 58, as hereinabove described.

Prior art links 154, 156, 158, 160 were rigidized at ±35° (FIG. 9) as opposed to ±30° for the present invention 20. More importantly, the prior art utilizes a 0.5 p straight lead in followed by a 1.0 p transition length (FIG. 9). Thus, the links (in the same row) do, in fact, transition sequentially, link 156 beginning transition just as link 150 completes its transition.

The present invention features a 1.0 p straight lead in and a 2.0 p transition length (FIG. 12). Thus, link 30 begins its transition when link 32 still has one pitch to go. Path geometry is also optimized.

That is, the prior art 150 used two equal blend radii of approximately 0.870 p preceded by a 0.496 p straight. The present invention 20 uses an initial radius of 3.867 p blending to a reverse radius of 3.608 p. (This geometry results in the inflection point of the two radii being located exactly 1p from the beginning of the transition). Also a 2p transition length is optimal. A longer transition length is actually worse.

The link perimeter, in accordance with the present invention, allows the chain 20 to be rigidized over a 2p transition length without interference as the links concurrently rotate into position.

Although there has been hereinabove described a specific rigidizable chain in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element which is not specifically disclosed herein. Accordingly, any and all modifications, variations or equivalent arrangements which may occur to those skilled in the art, should be considered to be within the scope of the present invention as defined in the appended claims.

What is claimed is:

1. A rigidizable chain apparatus comprising:
a plurality of rows of links, each of the links in all rows having identical perimeters; and
pins pivotally attaching two adjacent links of one of the plurality of rows to one link of another of the plurality of rows, each link having a perimeter enabling fixed engagement of adjacent links in each row upon coordinated pivoting of the adjacent links in each row and enabling release of the fixed engagement upon reverse coordinate pivoting of the adjacent links in each row, the perimeter of each link including an extending arm portion and a spaced apart notch receiving an extending arm portion of another adjacent link, the extending arm portion of each link having a concave contour enabling contact between adjacent links to provide a generally oval gap between a corresponding notch of an adjacent link with a concave contour upon fixed engagement of adjacent links.

2. The chain apparatus according to claim 1 further comprises a ramp disposed in operative communication with the links and pivoting the links in the link pins over the ramp, said ramp having a length approximate equal to a length of each link.

3. A rigidizable chain comprising:
first, second, and third rows of links;
pins pivotally attaching the one link of the second row to two adjacent link of the third row;
each link having a perimeter enabling fixed engagement of adjacent links in each row upon coordinated pivoting of adjacent links in each row and enabling release of the fixed engagement upon reverse coordinated pivoting of the adjacent links in each row, the perimeter of each link including an extending arm portion an a spaced apart notch receiving and extending arm portion of another adjacent link, the extending arm portion of each link having a concave contour enabling contact between adjacent links with a generally oval gap between a corresponding notch of an adjacent link with the concave contour upon fixed engagement of adjacent links.

\* \* \* \* \*